United States Patent
Bathen (10) Patent No.: US 9,645,842 B2
(45) Date of Patent: May 9, 2017

(54) CYBERNAUT: A CLOUD-ORIENTED ENERGY-EFFICIENT INTRUSION-TOLERANT HYPERVISOR

(71) Applicant: United States Government as represented by the Secretary of the Navy, Washington, DC (US)

(72) Inventor: Luis Angel D. Bathen, San Jose, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 9 days.

(21) Appl. No.: 14/697,743

(22) Filed: Apr. 28, 2015

(65) Prior Publication Data

US 2016/0321093 A1  Nov. 3, 2016

(51) Int. Cl.
    *G06F 9/455* (2006.01)
    *G06F 17/30* (2006.01)
    *G06F 21/53* (2013.01)

(52) U.S. Cl.
    CPC ...... *G06F 9/45558* (2013.01); *G06F 17/3089* (2013.01); *G06F 21/53* (2013.01);
(Continued)

(58) Field of Classification Search
None
See application file for complete search history.

(56) References Cited

U.S. PATENT DOCUMENTS

| 7,549,167 B1 | 6/2009 | Huang et al. |
| 7,680,955 B2 | 3/2010 | Arsenault et al. |

(Continued)

FOREIGN PATENT DOCUMENTS

| CN | 102917015 A | * | 2/2013 | |
| FR | EP 3057283 A1 | * | 8/2016 | ............ G06F 21/53 |
| RU | 2557476 C2 | * | 7/2015 | |

OTHER PUBLICATIONS

Krishnan et al, VM Power Metering: Feasibility and Challenges, 2010, ACM, ACM SIGMETRICS Performance Evaluation Review, vol. 38 Issue 3, pp. 56-60.*

(Continued)

*Primary Examiner* — Abu Ghaffari
(74) *Attorney, Agent, or Firm* — SPAWAR Systems Center Pacific; Kyle Eppele; J. Eric Anderson (57) ABSTRACT

An apparatus comprising: a virtual machine (VM) base image database; a VM image generator configured to build in the VM base image database a corpus of possible VMs that may run on a cloud service provider; an energy profiler configured to generate energy profiles offline of each permutation in the VM base image database under several different operating conditions; an energy profile database populated with the energy profiles generated by the energy profiler; and a monitor configured to monitor energy patterns in side-channels at the VM level and to compare the energy patterns for each VM operating on the cloud service provider with the energy profiles stored in the energy profile database, and further configured to trigger a self-cleansing cycle when a given real-time energy pattern deviates from its corresponding energy profile by a predetermined threshold amount.

10 Claims, 5 Drawing Sheets

(52) U.S. Cl.
CPC ............. *G06F 2009/45591* (2013.01); *G06F 2009/45595* (2013.01)

(56) References Cited

U.S. PATENT DOCUMENTS

| | | | |
|---|---|---|---|
| 7,725,531 | B1 | 5/2010 | Arsenault et al. |
| 8,260,963 | B2 | 9/2012 | Huang et al. |
| 8,356,106 | B2 | 1/2013 | Sood |
| 8,429,219 | B2 | 4/2013 | Arsenault et al. |
| 8,850,528 | B2* | 9/2014 | Van Biljon ............ G06Q 30/04 707/783 |
| 2007/0300220 | A1* | 12/2007 | Seliger ..................... G06F 8/61 718/1 |
| 2009/0144579 | A1* | 6/2009 | Swanson ............ G06F 11/0712 714/3 |
| 2012/0185913 | A1* | 7/2012 | Martinez ................ G06F 9/455 726/1 |
| 2013/0024573 | A1* | 1/2013 | Kushida ................ G06F 9/5077 709/226 |
| 2013/0111492 | A1* | 5/2013 | Nojiri .................... G06F 1/206 718/104 |
| 2013/0152079 | A1* | 6/2013 | Heyman ............. G06F 9/45558 718/1 |
| 2013/0227699 | A1* | 8/2013 | Barak .................... H04L 63/10 726/26 |
| 2013/0268791 | A1* | 10/2013 | Yamana ................ G06F 1/3293 713/323 |
| 2014/0208426 | A1* | 7/2014 | Natarajan .......... H04L 63/1416 726/23 |
| 2014/0317737 | A1* | 10/2014 | Shin .................... H04L 63/1408 726/23 |
| 2014/0337836 | A1* | 11/2014 | Ismael .................... G06F 9/455 718/1 |
| 2014/0344808 | A1* | 11/2014 | Banerjee ................ G06Q 30/04 718/1 |
| 2015/0295945 | A1* | 10/2015 | Canzanese, Jr. .... G06F 9/45545 726/23 |
| 2016/0077539 | A1* | 3/2016 | Lee ........................... G05F 1/66 700/291 |

OTHER PUBLICATIONS

Limrattanasilp et al, Virual Machine Allocation Using Server Power Profile, 2014, IEEE, 11th International Join Conference on Computer Science and Software Engineering (JCSSE), pp. 128-133.*

Chan et al, An Approach to High Availability for Cloud Servers with Snapshot Mechanism, 2012, ACM, Middleware 2012 Industry Track, pp. 1-6.*

Li et al, VM-based Architecture for Network Monitoring and Analysis, 2008, IEEE, The 9th International Conference for Young Computer Scientists, pp. 1395-1400.*

Bangalore et al, Securing Web Servers Using Self Cleansing Intrusion Tolerance (SCIT), 2009, IEEE, 2009 Second International Conference on Dependability, pp. 60-65.*

Nguyen et al, Realizing S-Reliability for Services via Recovery-driven Intrusion Tolerance Mechanism, 2010, IEEE, 2010 International Conference on Dependable System and Networks Workshops (DSN-W), pp. 176-181.*

Wang et al, Secure Server Switching System, 2010, IEEE, 2010 Second International Conference on Computer Engineering and Applications, pp. 224-228.*

* cited by examiner

Fig. 1

*Prior Art*

CYBERNAUT: A CLOUD-ORIENTED ENERGY-EFFICIENT INTRUSION-TOLERANT HYPERVISOR

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102492.

CROSS-REFERENCE TO RELATED APPLICATION

This application is related to U.S. application Ser. No. 14/697,785, filed 28 Apr. 2015, titled "System and Method for High-Assurance Data Storage and Processing based on homomorphic Encryption", which application is hereby incorporated by reference herein in its entirety for its teachings.

BACKGROUND OF THE INVENTION

The emergence of e-commerce/e-government as well as Web 2.0 media/content-rich web-portals (e.g., YouTube®, Facebook®, etc.) has motivated the need to grow computing infrastructures on-demand. In order to provide a rich user interface and fast online-services to their users, many businesses/governments have moved towards cloud computing. The cloud concept allows entities to grow/shrink the necessary compute and storage resources as needed without having to invest in their own infrastructure. The cloud provides an on-demand compute and storage model that makes it possible for many companies/businesses to cope with the demands of their growing/shrinking user base via a pay-for-what-you-need model.

Cloud computing allows companies to consolidate their infrastructure and grow it on-demand. Rather than having to rely on physical hardware, companies may opt to either 1) Host virtual environments in their physical data centers (a private-cloud model) or 2) outsource their compute needs to a third party, which then provides access to virtualized resources (e.g., a public cloud offering such as Amazon®'s AWS). The technology that makes cloud computing a reality is the concept of virtualization. Virtualization of servers and storage components (e.g., disk) allows cloud service providers to provide their customers with elastic compute (virtual computers) and storage (virtual disks) on demand. Virtualization relies on the concept of being able to create virtual machine (VM) instances that are basically self-contained images that allow the execution of its contents as if they were running on a physical computer, where each VM has an operating system and a given software stack to support a specific operation or service. Cloud users will then have the ability to launch new virtual machines based on pre-configured VMs to cope with increasing user demand (peak times) and turn them off when no longer needed.

Prior to the cloud, a user's data would reside in the service provider's data center. This meant that each service provider (e.g., a bank or government agency) was responsible for guaranteeing the integrity and safety of the given service, IT infrastructure, and data. By pushing data and the services that manipulate the data to the cloud, service providers no longer have control/the ability to protect their data, thus they are at the mercy of the cloud provider. Moreover, multi-tenancy is another issue cloud users have to deal with, as their data and services may reside on the same physical servers as other companies'. This means that even if a given service provider does his/her best to provide secure entry to their services (running on one VM), their efforts might be for naught as their services may reside on the same physical machine as that of other users who may not have security as their priority. This means that in the event that one VM within the same cloud infrastructure/physical system is compromised, other tenants within the same infrastructure/physical system may be now vulnerable as hypervisor root-kits have been shown to allow attackers to be able to break out of the sandbox (isolated protection) provided by the hypervisor.

SUMMARY

Disclosed herein is an apparatus comprising: a virtual machine (VM) base image database, a VM image generator, an energy profiler, an energy profile database, and a monitor. The VM image generator is communicatively coupled to the VM base image database and is configured to generate permutations offline of different software stacks to build in the VM base image database a corpus of possible VMs that may run on a cloud service provider. The energy profiler is communicatively coupled to the VM base image database and is configured to generate energy profiles offline of each permutation in the VM base image database under several different operating conditions. The energy profile database is communicatively coupled to the energy profiler and is populated with the energy profiles generated by the energy profiler. The energy profile database is also configured such that it is only accessible to components that reside below a VM layer and is not accessible to entities in a cloud environment. The monitor is configured to monitor energy patterns in side-channels at the VM level and to compare the energy patterns for each VM operating on the cloud service provider with the energy profiles stored in the energy profile database. The monitor is further configured to trigger a self-cleansing cycle when a given real-time energy pattern deviates from its corresponding energy profile by a predetermined threshold amount.

The apparatus described herein performs the following steps. The first step provides for generating permutations offline of different software stacks to build a corpus of possible virtual machines (VMs) that may run on a cloud service provider. The next step provides for storing the permutations in a VM base image database. The next step provides for populating an energy profile database offline with known energy profiles of each permutation in the VM base image database under several different operating conditions. The energy profile database is only accessible to components that reside below the VM layer and is not accessible to entities in a cloud environment. The next step provides for monitoring energy patterns in side-channels at the VM level. The next step provides for comparing the energy patterns for each VM operating on the cloud service provider with the energy profiles stored in the energy profile database. The next step provides for triggering a self-cleansing cycle when a given energy pattern deviates from its corresponding energy profile by a predetermined threshold amount.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
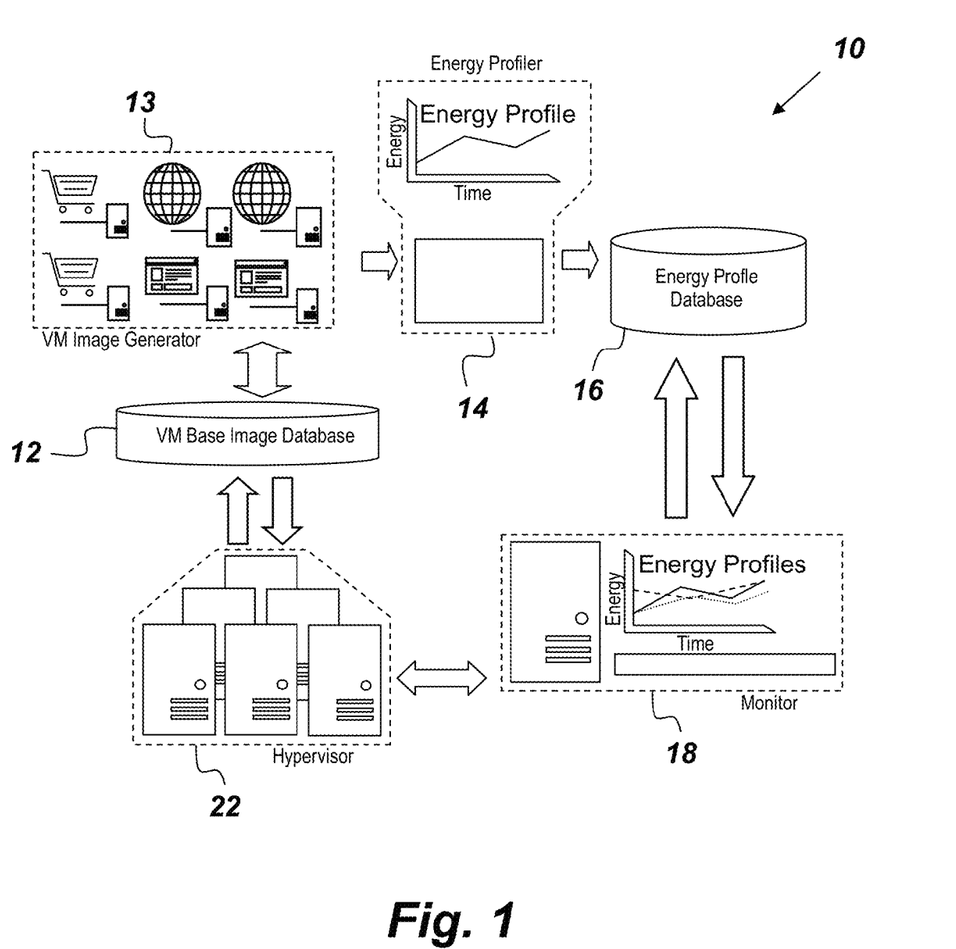
FIG. 1 is a block diagram of a host-based intrusion-tolerant hypervisor.

FIG. 1 is a conceptual block diagram of a host-based intrusion-tolerant hypervisor, referred to herein as Cybernaut 10. Cybernaut 10 comprises, consists of, or consists essentially of a virtual machine (VM) base image database 12, a VM image generator 13, an energy profiler 14, an energy profile database 16, and a monitor 18. The VM image generator 13 is communicatively coupled to the VM base image database 12 and is configured to generate permutations offline of different software stacks to build in the VM base image database 12 a corpus of possible VMs that may run on a cloud service provider. The energy profiler 14 is communicatively coupled to the VM base image database 12, wherein the energy profiler is configured to generate energy profiles offline of each permutation in the VM base image database 12 under several different operating conditions. The energy profile database 16 is communicatively coupled to the energy profiler 14. The energy profile database 16 is populated with the energy profiles generated by the energy profiler 14 of each permutation in the VM base image database 12. The energy profile database 16 is only accessible by components that reside below a VM layer and is not accessible to entities in a cloud environment. The monitor 18 is configured to monitor energy patterns in side-channels at the VM level and to compare, in real time, the energy patterns for each VM operating on the cloud service provider with the energy profiles stored in the energy profile database 16, and further configured to trigger a self-cleansing cycle when a given real-time energy pattern deviates from its corresponding energy profile by a predetermined threshold amount. In FIG. 1, the monitor 18 is shown as part of a hypervisor 22 running various domains (i.e. virtual instances).

Cybernaut 10 provides moving target defense capabilities to a cloud environment. The idea is to protect a cloud infrastructure against attackers that have managed to bypass various security mechanisms. Cybernaut 10 complements existing intrusion prevention (e.g., firewalls) and detection (host-based intrusion detection software) techniques installed at the host/VM level. Cybernaut 10 may reside in the lower levels of a software stack (e.g., hypervisor level, right above the hardware layer)(See FIG. 4). By monitoring energy profiles for the VMs, Cybernaut 10 can extract extra information not present at the VM level to identify possible intrusions and misbehaving software. Cybernaut 10 may provide moving target defense for cloud-based environments by exploiting the concepts of self-cleansing cycles (and their inherent redundancy), run-time monitoring of a machine's energy profile (a technique of defining and analyzing energy profiles for cloud services), and/or virtual-machine level mutations (via software stack randomization).

Moving target defense relies on the notion of changing aspects of a system in order to make it much more difficult for attackers to compromise a given system. Steps used for moving a target rely on various aspects from address space randomization also known as address space layout randomization (ASLR), Instruction Set Randomization, Data Randomization, to schemes such as self-cleansing intrusion-tolerant systems (SCIT), described below. Unlike traditional intrusion prevention and intrusion detection techniques, intrusion tolerant and moving target defense techniques work on the basis that attackers will in fact gain access to a computer system. Cybernaut 10 may be configured to limit the attack window (e.g., kill the connection between the attacker and the compromised machine) if the attacker gains access to the system. Cybernaut 10 may also be configured to change the system's behavior if an attack has been detected so that the attacker encounters a new version of the target, and he/she cannot use the same mechanism to compromise the machine again.

The VM base image database 12 may be in the form of a database such as MySQL® or PostgreSQL® that points to a file server with valid gold images. Alternatively, the VM image database 12 may similar to a key-value store that maintains pointers to a file store containing the gold images. The VM image generator 13 may be any off-line tool that generates permutations between different software stacks (e.g., service types, OS type, etc.). For example, a virtual server may consists of a CentOS 6.3 operational system baseline, with various software packages installed such as Apache®'s HTTP server/Tomcat®, PHP support, etc., or perhaps a baseline database server running MySQL®, PostgreSQL®, MongoDB®, etc. The VM image generator 13 builds a corpus of variation in the possible VMs that may launch to provide a given service. For instance, one can provide access to an application server by running a VM with Apache® Tomcat® and another one with Jetty®. These instances are then sent back to our VM base image database 12.

The energy profiler 14 takes virtual machine instances and builds energy profiles for each VM running under different conditions. These profiles are the basis for the monitor 18. The idea is to characterize the profiles so that the monitor 18 can then verify whether a given VM is compromised or not. The idea is to quickly identify intrusions and minimize attacks suck as data exfiltration.

The energy profile database 16 is used by the run-time monitor and serves as the basis for monitoring. The energy profiles stored in the energy profile database 16 can be tuned through the lifetime of the given service as administrators may allow for Cybernaut 10 to learn usage patterns under highly monitored time instances. This will allow Cybernaut 10 to refine the energy profiles for the different service types. Note that the energy profile database 16 is only accessible by Cybernaut 10's components, which reside below the VM-layers and are not accessible by outside entities in a cloud environment.

The monitor 18 takes energy profiles and tracks energy patterns for each VM at different interfaces (CPU, Memory, Disk, Network), any deviation within the norm triggers a self-cleansing cycle similar to the SCIT technology. Cybernaut 10 may be configured to detect VM behavioral change over time (e.g., a VM doing anything other than providing the service it was intended to do). And like SCIT, Cybernaut 10 may also be configured to perform window-based self-cleansing cycles, a difference being that the windows needed for self-cleansing need not be as short as in SCIT given that Cybernaut 10 is assisted by the runtime-monitor 18 to detect intrusions. Moreover, unlike SCIT, Cybernaut 10 provides the means to vary the attack surface as in the event of intrusions, attackers will not encounter the same VM type the next time they try to enter or escalate the system. This means that if an attacker breaks into a VM, the next time he/she tries to use the same mechanisms to break into a VM in the cycle, he/she will encounter a completely different instance and will not be able to break in as easily.

Figure 2A:
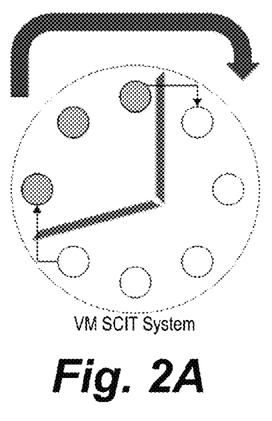
FIGS. 2A-2C are illustrations of a self-cleansing cycle.
Figure 2B:
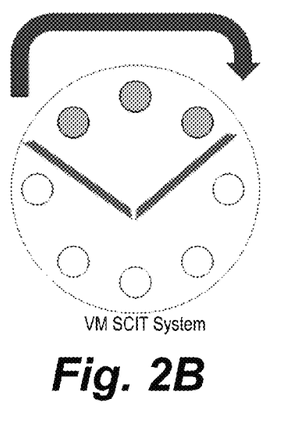
Figure 2C:
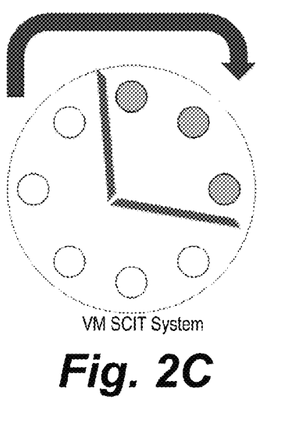

FIG. 2 is an illustration of a traditional SCIT cleansing cycle. SCIT from SCIT labs is a technology that leverages the concept of window-based self-cleansing cycles. FIGS. 2A-2C demonstrate the concept behind SCIT, where a switch-over cycle is shown for a 30 second window. SCIT systems, like most intrusion-tolerant systems, rely on similar concepts as those of fault-tolerance, where ideas such as redundancy help verify correct behavior in a system. In the scenario depicted in FIGS. 2A-2C, SCIT deploys a total of eight virtual images to provide a single service, where each circle represents the state in a given cleansing cycle. The smaller circles (dark and light) represent virtual machine instances. The shaded circles show a live-VM instance that is providing a given service; the white circles represent VMs undergoing maintenance/validation or off-line instances. FIG. 2A shows a candidate pair for swapping, where VMs that have been validated/certified as clean VMs are swapped for running instances that are then subjected to further analysis and removed from the network. These state transitions are performed again every 30 seconds, as shown in FIGS. 2B and 2C. This allows systems to remain up to date in clean states while minimizing the exposure time of the underlying system. One of the biggest drawbacks of SCIT is the need to have a larger amount of live instances to support a given service. For instance, for each virtual machine they protect, they need at least 2 more virtual machines to be operational to do rotations. This does not scale well in a cloud environment as the number of services in the cloud keep increasing/decreasing on demand. As a result, for each new service, one would need to have the redundant VMs to complete a self-cleansing cycle. Not only is this not a scalable solution but also a costly solution, as keeping live VM instances will require extra memory, storage, and CPU cycles (in essence, resources), which directly affect how costly this scheme is in a cloud environment as facilities need to pay for the energy utilized by the system (each VM consumes power), which also translates to the need for more cooling as racks in the datacenters hosting SCIT-enabled systems will have many more VMs running, consuming power, and increasing the temperature of the datacenters. Moreover, SCIT does not monitor the behavior of a given VM in the system, rather, it always assumes that the system has been compromised so it will simply swap VMs as shown in FIGS. 2A-2C.

With each cleansing cycle, Cybernaut 10 may be configured to vary the attack surface by selecting a set of different base VMs to deploy for the same service and to start the initial clean cycle following the concept of SCIT, as shown in FIG. 2, with a window of at most t-minutes, where t can be tuned depending on the environment in which Cybernaut 10 is deployed. Each VM's energy profile is loaded onto the run-time side-channel monitor 18 (e.g., energy monitor). These energy profiles may be characterized off-line by the energy profiler 14, which tracks energy usage for a given service/software-stack and generates a good known state in the form of energy thresholds. These energy thresholds/histograms allow Cybernaut 10 to monitor a service at run-time and look for possible intrusions/mis-configurations/performance degradation in the form of deviations from a well-known state. In the case such deviation is found, Cybernaut 10 may be configured to proceed to swap VM states as in a SCIT cycle, with the main difference that the new VM is a different version of the VMs in the cleansing cycle. This provides a moving-target defense mechanism that leverages the monitoring of side-channels (e.g., energy) to generate cleansing cycles.

Figure 3:
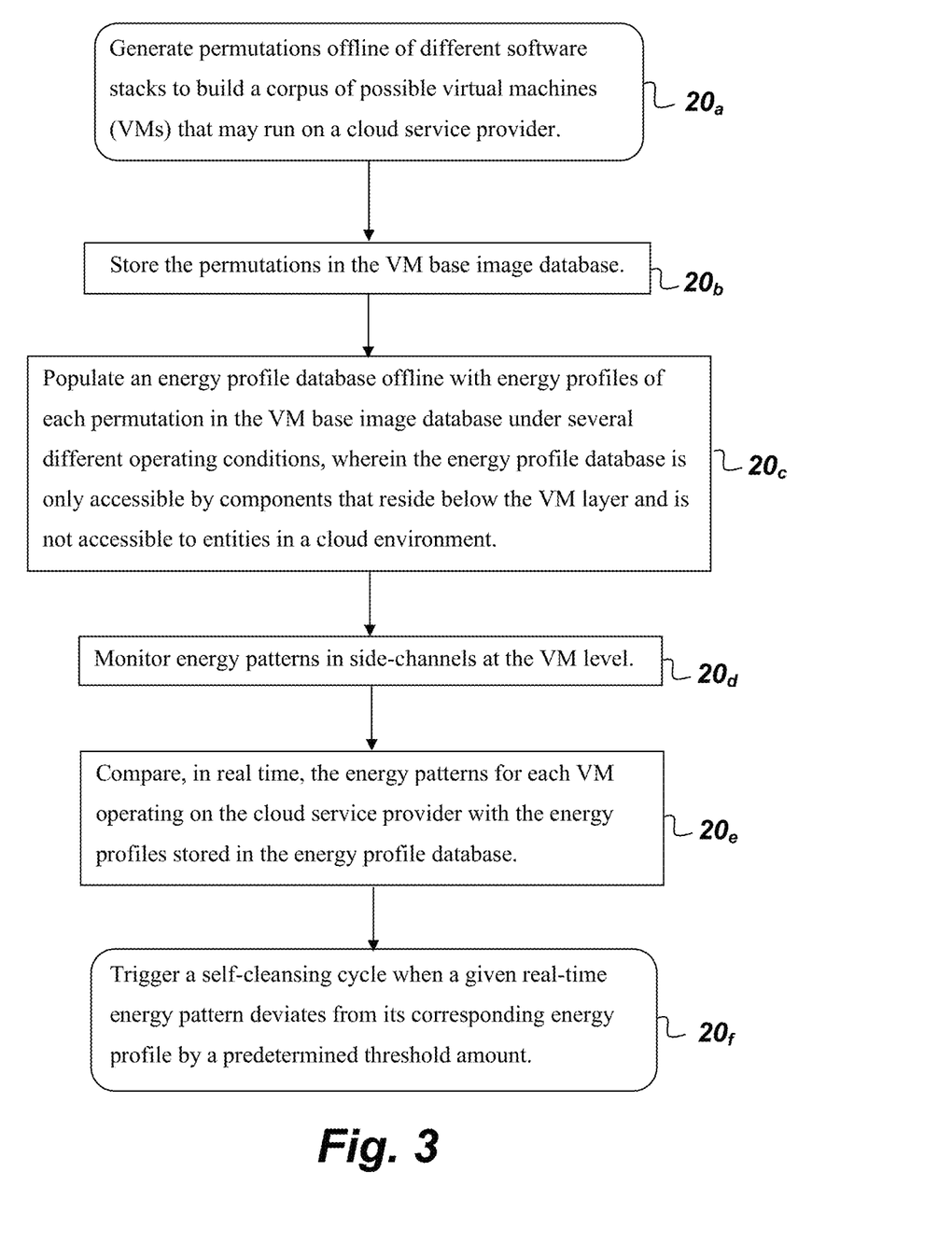
FIG. 3 is a flowchart of steps taken by a host-based intrusion-tolerant hypervisor.

FIG. 3 is a flowchart depicting steps taken by the Cybernaut 10. The first step 20$_a$ provides for generating permutations offline of different software stacks to build a corpus of possible virtual machines (VMs) that may run on a cloud service provider. Then next step 20$_b$ provides for storing the permutations in the VM base image database 12. Then next step 20$_c$ provides for populating an energy profile database 16 offline with energy profiles of each permutation in the VM base image database 12 under several different operating conditions, wherein the energy profile database is only accessible by components that reside below the VM layer and is not accessible to entities in a cloud environment. Then next step 20$_d$ provides for monitoring energy patterns in side-channels at the VM level. Then next step 20$_e$ provides for comparing, in real time, the energy patterns for each VM operating on the cloud service provider with the energy profiles stored in the energy profile database. Then next step 20$_f$ provides for triggering a self-cleansing cycle when a given real-time energy pattern deviates from its corresponding energy profile by a predetermined threshold amount.

Figure 4:
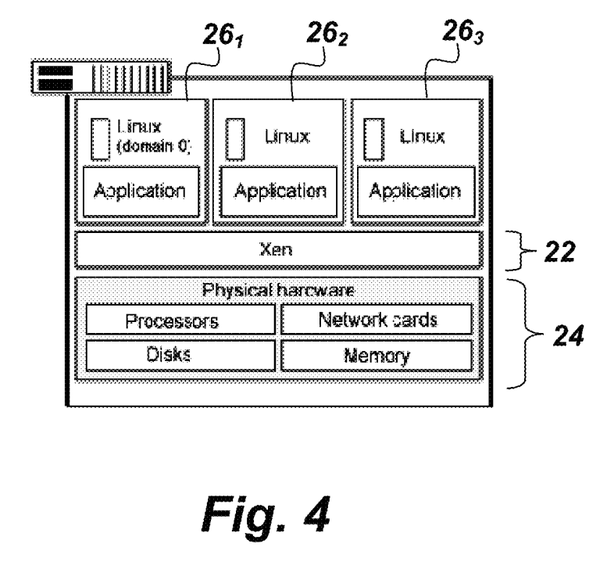
FIG. 4 is an illustration of an embodiment of a hypervisor, physical hardware, and several virtual machines.

FIG. 4 is an illustration of an example embodiment of a hypervisor 22. The monitor 18 is a component within the hypervisor 22. In this embodiment, the hypervisor 22 is a Xen hypervisor that sits between the physical hardware 24 (e.g., a server) and the VMs 26 and is configured to abstract out all components from the VMs 26. The domain 0 tag represents the main operational system that manages the server. Typically, when installing a Type-1 hypervisor such as Xen, IT specialists would install an operational system such as Ubuntu or CentOS as the main management operational system (DomO). Once a DomO OS is installed, the Xen hypervisor is installed. Typically this process requires a few command lines, for instance, in Ubuntu 12.04, users can enter: apt-get install xen-hypervisor-amd64. And they will have Xen installed on their machines. Once Xen is installed, users may start creating virtual machines (DomUs), which then host a variety of services (e.g., web servers, database servers, etc.).

Figure 5:
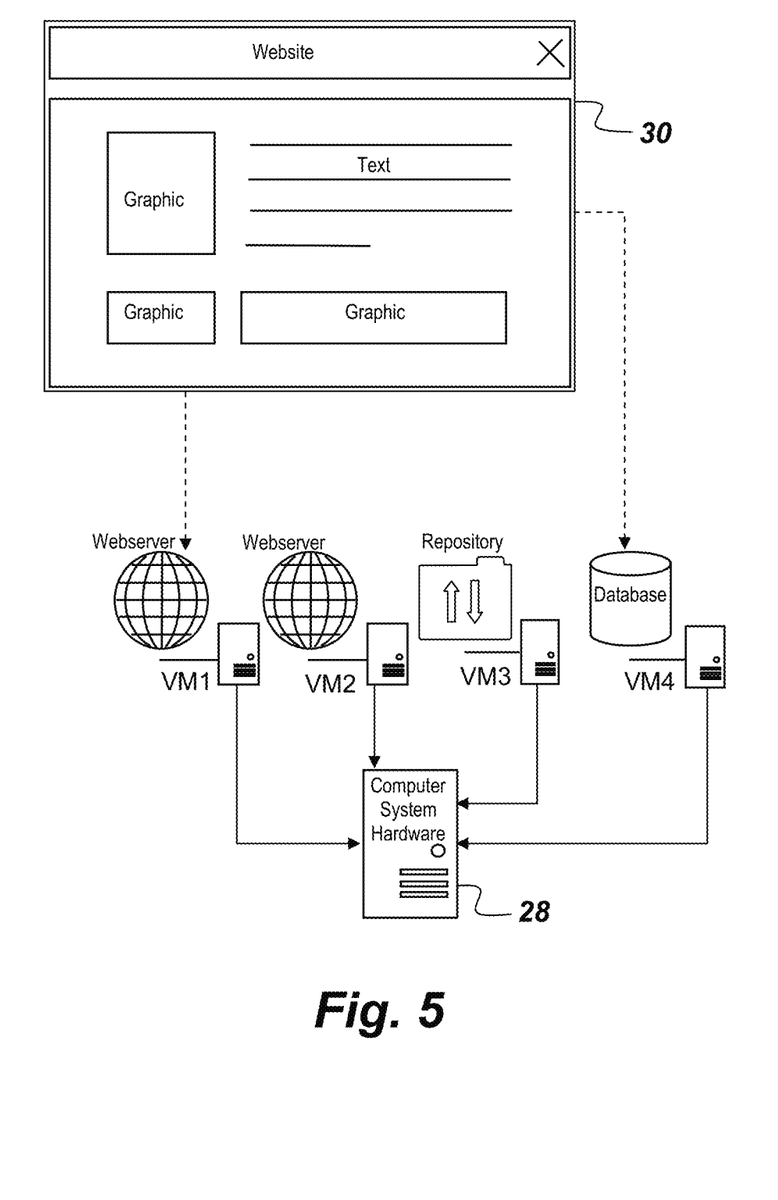
FIG. 5 is an illustration of an embodiment of a host-based intrusion-tolerant hypervisor.

FIG. 5 shows a diagram of an embodiment of Cybernaut 10's target/attached hardware 28. The hypervisor 22, in this embodiment is working on an HP Z420 system, with 16 GB or RAM, and an Intel® Xeon® E5-1603 0 @ 2.80 GHz processor. Each VM (i.e., VM1, VM2, VM3, and VM4) in FIG. 5 represents a virtual machine, which is a representation of a virtual server instance, which would replace a physical piece of hardware. These VM instances then host web services such as websites/webservers, databases/database servers, ftp repositories/ftp servers, etc. FIG. 5 shows an example website 30, which would run at the application layer as shown in FIG. 4. The different components (web server, data base server, etc.) that support website 30 may run as applications spread across different VM (dashed arrows in FIG. 5). Each VM is isolated from its surroundings and operates as if it was running on a physical server. Cybernaut 10 protects web services such as website 30 by protecting its underlying virtualized resources. For instance, take VM1 in FIG. 5, which represents the main webserver that runs the software for website 30. VM1 is protected by Cybernaut 10 by creating different versions of VM1, and monitoring VM1's energy profile in real-time. Any deviation of VM1's real-time energy profile from the expected energy profile stored in the energy profile database 16 would cause Cybernaut 10 to fetch a new VM1 type called VM1', and replace the old VM1 with the newer version. This allows one to keep website 30 software running without affecting its users' online experience.

The time window between cleansing cycles of Cybernaut 10 may vary based on how much deviation from a normal energy profile is present. In the event that deviations are not present, the window of a self-cleansing cycle may be set to a maximum time t. Cybernaut 10 relies on reacting to changes in the energy profile of a given VM, and thereby has the ability to set longer automatic self-cleaning window times t while still providing the same level of protection as traditional SCIT approaches. The range of time t is a tunable parameter. With traditional SCIT, t is fixed based on how much exposure time administrators are willing to tolerate. Cybernaut 10 can trigger self-cleansing cycles at any moment if a deviation from the norm (energy profile does not match the expected value) is detected. These profiles are obtained through correlation analysis by monitoring performance counters from each system. These counters are used to track energy of each VM. This is a feature SCIT lacks. Cybernaut 10 could be deployed not only in cloud environments but any environment that relies on having a layer lower than the operational system. For instance, emerging virtualization technologies for mobile devices may benefit from Cybernaut 10 as one can potentially also monitor side-channels at the VM level for those technologies. Cybernaut 10 can be realized as a monitoring component in any hypervisor layer and is not limited to the use of the Xen hypervisor. Other suitable example of hypervisors include, but are not limited to, VMware, vSphere Hypervisor, and Windows Hyper-V. In an embodiment, Cybernaut 10 may run as an application service/daemon in the dom0 layer (within an OS, with hypervisor support) that invokes various hypervisor management tools/APIs to deal with the VMs in the system. Cybernaut 10 could also be middleware that lies below the OS and monitors the OS's energy profiles. In another embodiment, Cybernaut 10 can be an application/service that runs within an OS and monitors the OS's energy profile in order to take a reactive approach such as a self-refresh. Basically, upon generating a self-refresh event, the OS should be smart enough to instantiate a variant of itself or at least trigger a message for other tools (e.g., anti-virus software) to take action.

From the above description of Cybernaut 10, it is manifest that various techniques may be used for implementing the concepts of Cybernaut 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that Cybernaut 10 is not limited to the particular embodiments described herein, but is capable of many embodiments without departing from the scope of the claims.

I claim:

1. An apparatus comprising:
   a computer system having a processor, memory and network interface, wherein said computer system is adapted to perform operations online over a computer network through the network interface and offline off of the computer network;
   a virtual machine (VM) base image database integral with said computer system;
   a VM image generator integral with said computer system and communicatively coupled to the VM base image database, wherein the VM image generator is configured to generate permutations offline of different software stacks to build in the VM base image database a corpus of possible VMs which are capable of running on a cloud service provider;
   an energy profiler integral with said computer system and communicatively coupled to the VM base image database, wherein the energy profiler is configured to generate energy profiles offline of each permutation in the VM base image database under different operating conditions;
   an energy profile database integral with said computer system and communicatively coupled to the energy profiler, wherein the energy profile database is populated with the energy profiles generated by the energy profiler, and wherein the energy profile database is configured such that it is only accessible to components that reside below a VM level and is not accessible to entities in a cloud environment; and
   a monitor integral with said computer system and configured to monitor side-channel energy patterns at the VM level and to compare, for each VM operating on the cloud service provider, the energy pattern of the operating VM with the operating VMs corresponding energy profiles stored in the energy profile database, and further configured to trigger a self-cleansing cycle every t minutes, wherein t is a finite period of time greater than two, and to trigger the self-cleansing cycle when a given real-time energy pattern deviates from all of its corresponding energy profiles by a predetermined threshold amount.

2. The apparatus of claim 1, wherein during the cleansing cycle, the monitor is configured to replace a suspected-compromised VM with a second VM that is different from, but that performs the same function as, the suspected-compromised VM.

3. The apparatus of claim 2 wherein the monitor is configured to compare energy profiles in real-time.

4. The apparatus of claim 1, wherein the monitor is a component of a hypervisor.

5. The apparatus of claim 4, wherein the hypervisor is a Xen hypervisor.

6. A method comprising the following steps:
   generating permutations offline off of a computer network of different software stacks to build a corpus of possible virtual machines (VMs) which are capable of running on a cloud service provider;
   storing the permutations in a VM base image database;
   populating an energy profile database offline with known energy profiles of each permutation in the VM base image database under different operating conditions, wherein the energy profile database is only accessible to components that reside below a VM level and is not accessible to entities in a cloud environment;

monitoring side-channel energy patterns at the VM level;

comparing, for each VM operating on the cloud service provider, the energy pattern of the operating VM with the operating VMs corresponding energy profiles stored in the energy profile database; and triggering a self-cleansing cycle when a given real-time energy pattern deviates from its corresponding energy profile by a predetermined threshold amount, and also triggering the self-cleansing cycle every t minutes, wherein t is a finite period of time greater than two.

7. The method of claim 6, wherein during the cleansing cycle, the monitor replaces a suspected-compromised VM with a second VM that is different from, but that performs the same function as, the suspected-compromised VM.

8. The method of claim 7, wherein the monitor is configured to compare energy profiles in real-time.

9. The method of claim 6, wherein the monitor is a component of a hypervisor.

10. The method of claim 9, wherein the hypervisor is a Xen hypervisor.

* * * * *